United States Patent [19]

Graefe et al.

[11] 3,929,730

[45] Dec. 30, 1975

[54] PROCESS FOR PREPARING POLYURETHANES EMPLOYING A MIXTURE OF BUTANEDIOL AND PHENYLENE DIETHANOLAMINE AS A CHAIN EXTENDER

[75] Inventors: Peter U. Graefe, Brick Town; Vincent J. Gajewski, Jackson; Ismael A. Jimenez, Farmingdale, all of N.J.

[73] Assignee: Inter-Polymer Research Corporation, Farmingdale, N.J.

[22] Filed: Dec. 28, 1973

[21] Appl. No.: 429,284

[52] U.S. Cl. .................. 260/77.5 AN, 260/2.5 AN, 260/2.5 AM, 260/77.5 AM
[51] Int. Cl.² ........................................ C08G 18/32
[58] Field of Search. 260/75 NP, 77.5 AM, 2.5 AM, 260/77.5 AN, 75 NC, 77.5 AC, 2.5 AC, 75 NH, 75 NQ, 77.5 AQ

[56] References Cited
UNITED STATES PATENTS

| 2,621,166 | 12/1952 | Schmidt et al. | 260/75 NQ |
|---|---|---|---|
| 2,741,800 | 4/1956 | Brockway | 260/75 NP |
| 2,753,319 | 7/1956 | Brockway | 260/75 NP |
| 2,871,218 | 1/1959 | Schollenberger | 260/75 NP |
| 3,051,687 | 8/1962 | Young et al. | 260/77.5 AN |
| 3,248,373 | 4/1966 | Barringer | 260/77.5 AM |
| 3,294,713 | 12/1966 | Hudson et al. | 260/75 NP |
| 3,476,933 | 11/1969 | Mendelsohn | 260/2.5 AM |
| 3,666,724 | 5/1972 | Hostettler | 260/77.5 AN |

*Primary Examiner*—H. S. Cockeram
*Attorney, Agent, or Firm*—Watson Leavenworth Kelton & Taggart

[57] ABSTRACT

A process for preparing polyurethane compositions is disclosed which comprises simultaneously reacting:
a. a polyol made up of at least one hydroxyl-terminated polyether diol, hydroxyl-terminated polyester diol or mixture thereof;
b. a polyisocyanate or quasi-prepolymer containing free isocyanate;
c. a mixture of polyfunctional chain extenders made up of butanediol and a sufficient amount of at least one other difunctional chain extender which is soluble in the polyol to render the mixture soluble in the polyol, the butanediol being present in the polyol at a level exceeding the maximum solubility of the butanediol in the absence of the soluble difunctional chain extender; and
d. a catalyst.

3 Claims, No Drawings

PROCESS FOR PREPARING POLYURETHANES EMPLOYING A MIXTURE OF BUTANEDIOL AND PHENYLENE DIETHANOLAMINE AS A CHAIN EXTENDER

BACKGROUND OF THE INVENTION

1. Field of the Invention

This invention belongs to the field of processes for preparing polyurethane compositions, for example, elastomers and foams. More particularly, this invention relates to processes for manufacturing polyurethane compositions which employ butanediol as a chain extender.

2. Description of the Prior Art

Various methods for preparing polyurethane compositions are known, principally, the "one-shot" and the "prepolymer" methods with a third method using a "quasi-prepolymer" system being a modification of the prepolymer method.

In the one-shot method, a polyol, typically of about 2,000 molecular weight, is simultaneously reacted with a polyisocyanate, chain extender and catalyst to provide a polyurethane elastomer.

The usual sequence of steps for conducting the prepolymer method includes the preparation of a straight prepolymer, or simply "prepolymer," in which the hydroxyl groups of the starting polyol have been reacted with a polyisocyanate to provide NCO termination. The prepolymer is then extended with a difunctional chain extender and finally, the mass is cured to provide a polyurethane elastomer.

To meet the demands of modern liquid injection molding techniques, a modification of the prepolymer method has been devised whereby a quasi-prepolymer is prepared. In general, about half of the polyol is reacted with a polyisocyanate to provide a quasi-prepolymer having NCO termination and a portion of unreacted polyisocyanate. This quasi-prepolymer is then reacted with the remaining polyol which contains a difunctional chain extender and catalyst to provide a polyurethane elastomer.

Regardless of which of the above methods is employed, current manufacturing practice has favored the use of the diamine chain extender, 4,4'-methylene-bis(2-chloroaniline) (Moca). According to *High Polymers*, Vol. XVI, *Polyurethanes: Chemistry and Technology II, Technology*, by Saunders and Frisch (1962), Moca cured elastomers give the highest mechanical strength properties possibly because of the stiffness of the aromatic groups and the strong interchain attraction exerted by the urea linkages in the chains. However, federal regulations promulgated in the Federal Register, Vol. 38, No. 144, July 27, 1973, classifying Moca as a carcinogen, now require special precautions for the manufacture, handling and use of this substance. Accordingly, it has become highly desirable to employ a polyfunctional chain extender other than Moca without appreciably sacrificing any of the advantageous physical properties of Moca-cured elastomers. The butanediols, and especially 1,4-butanediol, are of considerable interest as replacements for Moca since they are comparable to the latter with respect to curing time, ratio between gel time and demold time and properties of the cured elastomers. However, the butanediols are insoluble in polyols at the concentrations usually employed to yield polyurethanes of commercial interest, for example, at levels of from about 5 to 10% by weight of polyol, and their use is thus practically restricted to prepolymers, the only polyurethane reaction system in which they are fully soluble. While it is possible to use a dispersing agent to incorporate butanediol in a one-shot or quasi-prepolymer system, such is generally undesirable as the presence of any non-reactive components in the reaction mixture adversely affects the physical properties of the polyurethane elastomer.

A need therefore exists for a fully compatible one-shot or quasi-prepolymer system which can employ butanediol chain extenders without the need for adding any non-reactive substances to the reaction mixture.

SUMMARY OF THE INVENTION

It has been surprisingly discovered that a butanediol chain extender which is insoluble in polyols at the elevated concentrations called for by commercial polyurethane manufacturing processes can be made soluble by being added as mixtures with at least one other difunctional chain extender which is soluble in polyol.

Broadly, the present invention comprises reacting:

a. a polyol made up of at least one hydroxyl-terminated polyether diol, hydroxyl-terminated polyester diol or mixture thereof;

b. a polyisocyanate or quasi-prepolymer containing free isocyanate;

c. a mixture of polyfunctional chain extenders made up of butanediol and a sufficient amount of at least one other difunctional chain extender which is soluble in the polyol, to render the mixture soluble in the polyol, the butanediol being present in the polyol at a level exceeding the maximum solubility of the butanediol in the absence of the soluble difunctional chain extender; and d. a catalyst.

DESCRIPTION OF THE PREFERRED EMBODIMENTS

Examples of hydroxyl-terminated polyether diols which are useful herein include the linear or substantially linear polyalkylene ether glycols derived from alkylene oxides, glycols, heterocyclic ethers and other materials by polymerization, copolymerization and the like. For example, tetrahydrofuran can be polymerized in the presence of catalytic amounts of fluorosulfonic acid to provide a polytetramethylene ether glycol of the formula

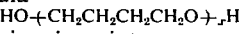
HO-(-CH$_2$CH$_2$CH$_2$CH$_2$O-)-$_x$H wherein $x$ is an integer corresponding to the number of moles of reacted tetrahydrofuran. Ethylene oxide/propylene oxide mixtures, propylene oxide and the like can be used to provide other polyalkylene ether glycols. Glycols can be polymerized in the presence of mineral acid, sulfonic acid or fuller's earth. Still other methods well known to the art can be employed for the preparation of polyalkylene ether glycols.

These linear polyether polyols can be represented by the formula:

HO-(-RO-)-$_x$H wherein R is an alkylene chain of at least two carbon atoms in length or aryl alkylene group and $x$ is an integer. Moreover, R can be a mixture of alkylene or an alkylene group, for example, alternating groups or blocks of ethylene and propylene radicals, i.e., a polyethylene/polypropylene ether glycols and polyethylene-propylene ether glycol, polyneopentylene ether glycol, polyhexamethylene ether glycol, poly 4-phenyl hexamethylene ether glycol, poly 1,6-heptamethylene ether glycol and the like. Advantageously the polyethers possess a molecular weight of about 2,000 although polyethers having a greater or lesser molecular weight than this figure can also be employed herein.

Examples of hydroxyl-terminated polyester diols which are useful in the process of this invention include the polyesters, advantageously, of a molecular weight of about 2,000, which are prepared by reacting a dihydric alcohol with a dicarboxylic acid. Any suitable dihydric alcohol such as, for example, ethylene glycol, propylene glycol, hexanediol, diethylene glycol, bis-(hydroxy methyl cyclohexane), polyethylene glycols, polypropylene glycols and the like can be used in the reaction with a dicarboxylic acid to form a polyester. Any suitable dicarboxylic acid can be used such as, for example, adipic acid, succinic acid, suberic acid, sebacic acid, methyl adipic acid, glutaric acid, pimelic acid, azelaic acid, phthalic acid, terephthalic acid, isophthalic acid, thiodiglycolic acid, thiodiproprionic acid, maleic acid, fumaric acid, and the like.

Hydroxyl terminated lactone polyesters (polylactones), advantageously of a molecular weight of about 2,000 and characterized by the presence of recurring lactone units can be employed in the process of this invention. These lactone polyesters include the polyesters of individual unsubstituted and substituted lactones and copolyesters of substituted and unsubstituted lactones as well as mixtures thereof.

The lactone used as a starting material may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

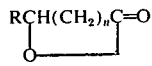

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring are considered unsuitable for the purposes of the invention because of the tendency that polymers thereof have to revert to the monomer, particularly at elevated temperature.

The lactones which are preferred in the preparation of the hydroxyl terminated lactone polyesters are the epsilon-caprolactones having the general formula:

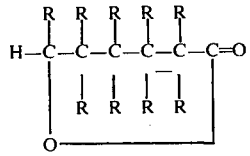

wherein at least six of the R variables are hydrogen and the remainder are hydrogen, alkyl, cycloalkyl, alkoxy, or single ring aromatic hydrocarbon radicals, none of the substituents contain more than about 12 carbon atoms, and the total number of carbon atoms in the substituents on the lactone ring does not exceed about 12. Unsubstituted epsilon-caprolactone, in which all the R variables are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in U.S. Pat. No. 3,064,008. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, mono-ethyl-, monopropyl-, monoisopropyl-, etc., to monododecyl epsilon-caprolactones; dialkyl epsilon-caprolactones in which the two alkyl groups are substituted on the same or different carbon atoms, but not both on the epsilon carbon atom, trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be employed. The various lactones may be utilized individually or in combination.

Bifunctional initiators which can be employed in the preparation of the hydroxyl-terminated lactone polyesters include those organic compounds which contain two alcoholic hydroxyl groups as illustrated by glycols of the formula $HO(CH_2)_nOH$ in which $n$ equals 2 to 10, glycols of the formula $HO(CH_2CH_2O)_nH$ and $HO[CH(CH_3)CH_2O]_nH$ in which $n$ equals 1 to 40, such as ethylene glycol, diethylene glycol, and the like; 2,2-dimethyl-1,3-propanediol; 2,2-diethyl-1,3-propanediol; 3-methyl-1,3-pentanediol; methyl- and ethyldiethanolamines; the various cyclohexanediols; 4,4'-methylenebiscyclohexanol; 4,4'-isopropylidenebiscyclohexanol; the ortho-, meta-, and para-xylylene glycols; the hydroxymethyl substituted phenethyl alcohols; the ortho-, meta, and para-hydroxymethyl phenylpropanols; the various phenylenediethanols; the various heterocyclic diols such as 1,4-piperazinediethanol; and the like. Polyester polyols prepared by the reaction of a dicarboxylic acid, its diester, or dihalide with a molar excess of a diol are likewise suitable, e.g., the reaction of 1 mole of adipic acid with 2 moles of ethylene glycol.

Other suitable diols include polyoxyalkylated derivatives of difunctional compounds having two reactive hydrogen atoms. These difunctional compounds may contain primary or secondary hydroxyls, phenolic hydroxyls, primary or secondary amine groups, amide, hydrazino, guanido, ureido, mercapto, sulfino, sulfonamide, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic glutaric, adipic pimelic, sebacic, phthalic, tetrahydrophthalic, and hexahydrophthalic; phosphorus acid; aliphatic, aromatic, and cycloaliphatic primary monoamines, like methylamine, ethylamine, propylamine, butylamine, aniline, cyclohexylamine; secondary diamines, like N,N'dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

Suitable bifunctional initiators also include those compounds which contain a sole alcoholic hydroxyl group as well as a primary or secondary amino group as exemplified by amino alcohols of the general formula:
$$HO(CH_2)_nNH_2$$
where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like.

Among the bifunctional initiators which contain a total of two primary and/or secondary amino groups include the aliphatic diamines of the general formula:
$$H_2N(CH_2)_nNH_2$$
the monosecondary diamines of the general formula:
$$R''NH(CH_2)_nNH_2$$
and the disecondary diamines of the general formula:
$$R''NH(CH_2)_nNHR''$$
where $n$ equals 2 to 10 and where $R''$ is alkyl, aryl, aralkyl, or cycloalkyl; the aromatic diamines, like meta-phenylene-diamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4',4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluorenediamine, and 2,7-fluorenediamine; the cycloaliphatic diamines like 1,4-cyclohexanediamine, 4,4'-methylenebiscyclohexylamine, and 4,4'-isopropylidenebiscyclohexylamine; and the heterocyclic amines such as piperazine, 2,5-dimethylpiperazine, and 1,4-bis(3-aminopropyl)-piperazine.

It is especially advantageous to employ the polylactones having high aromatic loading of commonly assigned, copending U.S. patent application, Ser. No. 429,381 filed of even date herewith, now abandoned. Such polylactones can be prepared using a bifunctional initiator, for example, a diol, diamine or aminoalcohol, having at least one aromatic ring. The resulting polylactones can be used for the manufacture of polyurethane elastomers possessing enhanced stiffness and hardness without the need for Moca as a curing agent. One such polylactone which is particularly useful for the present invention is the polyester diol of about 2,000 molecular weight resulting from the reaction of epsilon-caprolactone with a bifunctional alcohol of between about 350-500 molecular weight obtained from the reaction of phthalic acid or phthalic anhydride with ethylene glycol.

The manufacture of the polyester diols may be conducted in the presence or absence of a catalyst. If it is desirable to utilize a catalyst, conventional polyesterification and ester interchange catalysts may be employed in quantities from as low as 5 parts per million and lower, based upon the total weight of reactants, to as hight as about 0.3 percent, based upon the reactant amounts. A preferred range is from 5 to 1000 parts per million, based upon the reactants. Typical catalysts which are eminently suitable in conducting this process are tetraalkyl titanates such as tetraisopropyl and tetrabutyl titanates, stannous acylates such as stannous octoate and stannous oleate, lead acylates such as lead 2-ethylhexoate and many other compounds known to catalyze polyesterification reactions. As pointed out, it is also within the scope of the invention to perform the polymerization reaction in the absence of a catalyst which is at times desirable since it is known that metallic residues in the polyesters have a significant effect upon the catalysis of the subsequent reactions of the polyesters with the diisocyanates to produce the prepolymers.

The polymerization reaction is conveniently conducted at a temperature range of from about 100°C. to about 300°C., preferably from 100°C. to about 250°C., for periods sufficient to complete polymerization. Reaction times of a few hours to as much as about 48 hours are normally sufficient to accomplish polymerization. The reaction is preferably conducted in an inert atmosphere such as in the presence of nitrogen, methane, etc., to avoid discoloration of the resulting products.

Moreover, it is also advantageous to employ a polyether diol such as one of the aforecited polyether diols in combination with a polylactone prepolymer obtained by reacting a polylactone of the above type with a sufficient amount of polyisocyanate to provide a prepolymer in which the free isocyanate content is from about 12% to 30% and preferably, from about 15% to 25%. The polyether diol/polylactone prepolymer mixtures are fully disclosed in commonly assigned copending U.S. Pat. application Ser. No. 429,406 filed of even date herewith. In a preferred embodiment disclosed in the aforesaid U.S. Pat. application Ser. No. 429,406, a polylactone prepolymer is prepared by reacting epsilon-caprolactone in a well known manner with a difunctional initiator such as ethylene glycol to provide a poly(epsilon-caprolactone)polyester glycol having a molecular weight of about 2,000. Part or all of the poly(epsilon-caprolactone)polyester glycol thus obtained is then reacted with an excess of organic polyisocyanate such as diphenylmethane-4,4'-diisocyanate (MDI), the precise amount of MDI being sufficient to provide a free isocyanate content in the range of about 15 to 24%. In this manner, a quasi prepolymer is provided. The remaining portion of the poly(epsilon-caprolactone) polyester glycol, if any, which had not been reacted with MDI is then separately combined with a polyether diol of about 2,000 molecular weight, a chain extender such as tetramethylene glycol, and a catalyst for the polyurethane reaction. To provide a polyurethane molded article, preselectable quantities, depending upon the characteristics of the polymerizate desired, of quasi-prepolymer are thoroughly mixed in a high speed-screw mixing chamber with the polyether, unreacted poly(epsilon-caprolactone)polyester glycol, chain extender and catalyst mixture and the resulting reaction formulation is then injected into a mold where curing takes place. Polyurethane elastomers prepared from such mixtures have demonstrated excellent physical properties coupled with low demolding times.

As previously noted, the invention herein can be carried out via either the one-shot or quasi-prepolymer method. If it is desired to employ a quasi prepolymer, a portion of the polyether diol or polyester diol is reacted with an amount of polyisocyanate sufficient to provide a quasi prepolymer in which the average ratio of NCO groups to hydroxyl groups is greater than about 2:1.

Examples of mixtures of difunctional chain extenders which can be employed herein include, 1,3-butanediol, 2,3-butanediol and 1,4-butanediol in combination with such difunctional compounds as thiodiglycol (TDG) and phenylenediethanolamine (PDEA). While butanediols, at concentrations usually employed to yield polyurethanes of commercial interest are insoluble in polyurethane reaction mixtures containing polyol, a combination of these extenders generally made up with about 3 parts of butanediol of 1 part of thiodiglycol or PDEA is fully compatible. Numerous other mixtures of chain extenders can be prepared by those skilled in the art.

Useful polyisocyanates which can be used either in the one-shot or quasi-prepolymer methods include ehtylene diisocyanate, ethylidene diisocyanate, propylene diisocyanate, butylene diisocyanate, cyclopentylene-1,3-diisocyanate, 2,4-tolylene diisocyanate, 2,6-tolylene diisocyanate, 4,4'-diphenyl-methane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'diisocyanate, azobenzene-4,4'-diisocyanate, diphenyl-sulfone-4,4'-diisocyanate, dichlorohexamethylene diisocyanate, tetramethylene diisocyanate, pentamethylene diisocyanate, hexamethylene diisocyanate, furfurylidene diisocyanate, 1-chlorobenzene-2,4-diisocyanate and the like.

Any known and conventional catalyst for the polyurethane reaction is added to the solution or dispersion of polylactone prepolymer, polyether diol and chain extender. Commonly used catalysts are basic catalysts, either inorganic bases such as sodium hydroxide or sodium acetate or, more commonly tertiary amines and materials which generate tertiary amines. Triethylenediamine (DABCO) alone or together with other, secondary catalysts is advantageously employed. Other amine catalysts include N-methylmorpholine, triethylamine, and N,N,N',N'-tetramethyl-1,3-diaminobutane. Nonvolatile metal-containing catalysts can also be used, for example, stannous octoate and dibutyltin diacetate. Many other catalysts can be used as is evident to those skilled in the art.

The catalyst system disclosed in commonly assigned copending U.S. Pat. application Ser. No. 351,859 filed Apr. 17, 1973 is especially advantageous for use in the process of this invention. This system generally comprises (a) at least one basic amine catalyst for the polyurethane reaction having a catalytic activity about equal to or greater than triethylenediamine, (b) at least one organometallic catalyst for the polyurethane reaction; and (c) at least one basic amine catalyst for the polyurethane reaction having a catalytic activity less than that of catalysts (a) and (b) together present in the catalyst system in an amount by weight about equal to or greater than catalysts (a) and (b) and has been found to result in dramatically increased gel times, in some cases, up to 120 seconds or more. The use of 0.2 parts triethylenediamine, 0.2 parts dialkyl diazelate, 0.4 parts phenyl mercuric propionate and 1.0 parts of N-methyldicyclohexylamine or an N-alkylmorpholine such as N-methylmorpholine and tetramethyl guanidine as a catalyst system has been found to provide especially good results. The advantage of prolonging gel times permits the liquid injection molding of large amounts of polymerization mixture without the need for using slow reacting extenders such as the alkylene glycols and the hindered amines. Consequently, the overall rate of production is increased with a concomitant lower unit cost when such catalyst systems are employed in polyurethane elastomer reaction mixtures.

If it is desired to employ a blowing agent, any one of the known and conventional blowing agents can be used.

Examples of blowing agents which can advantageously be employed in the reaction mixtures of this invention include water in small amounts, for example, from about 0.5 to 5.0% based on the total weight of the reaction mixture of the halogen-substituted aliphatic hydrocarbons which have boiling points between about −40°C and 70°C and which vaporize at or below the temperature of the foaming reaction mass such as trichloromonofluoromethane, dichlorodifluoromethane, dichloromonofluoromethane, dichloromethane, trichloromethane, chloromethane, 1,1 dichloro-1-fluoroethane and the like and low boiling hydrocarbons such as butane, pentane, hexane and the like as well as carbon dioxide.

Minor amounts of polyfunctional cross-linking agents such as pentaerythritol and trimethylolpropane can also be added to the reaction mixtures herein.

The precise quantities of polyester diol, polylactone prepolymer, polyether diol, mixture of difunctional chain extender containing butanediol, catalyst, blowing agent and any other ingredients which may be optionally included in the reaction mixture of this invention can be varied within considerable limits while providing polyurethane compositions which possess excellent resistance to abrasion and highly desirable low temperature properties. Those skilled in the art of this invention are readily capable of formulating specific reaction mixtures to meet specific product needs.

The polyurethane reaction mixture consisting, on the one hand, polyester or polyether diol, mixture of butanediol and of other difunctional chain extender(s) and catalyst, and on the other, polyisocyanate, prepolymer or quasi-prepolymer is advantageously obtained by combining the two groups of materials in a high speed mixing and injecting apparatus of a type which has become recently available. A mixing and injecting apparatus available from the Desma-Werke GmbH, Achim near Bremen, Germany, capable of mixing screw speeds in excess of 10,000 r.p.m., has been found to be especially useful.

The liquid injection polyurethane reaction component supply system and molding apparatus of commonly assigned U.S. patent application Ser. No. 352,076 filed Apr. 17, 1973, now U.S. Pat. No. 3,853,446 granted Dec. 10, 1974, is advantageously employed with the process of this invention.

The steps of injecting the liquid reaction mixture into a mold, curing the contents of the mold and demolding the cured elastomer are well known and conventional operations.

What is claimed is:

1. A process for preparing polyurethane compositions which comprises reacting in the absence of any appreciable amount of dispersing agent:
    a. at least one polyoxypropylene glycol of about 2,000 molecular weight, poly(epsilon-caprolactone)polyester glycol of about 2,000 molecular weight or mixture thereof;
    b. a polyisocyanate, or a quasi-prepolymer prepared from the reaction of a poly(epsilon-caprolactone)-polyester glycol of about 2,000 molecular weight with an excess amount of polyisocyanate sufficient to provide an average ratio of NCO groups to hydroxyl groups greater than about 2:1;

c. a mixture of polyfunctional chain extenders comprising butanediol and a sufficient amount of phenylenediethanolamine to render the mixture soluble in the polyol, the butanediol being present in the polyol at a level exceeding the maximum solubility of the butanediol at ambient temperature in the absence of phenylenediethanolamine and d. a catalyst for the polyurethane reaction.

2. The process of claim 1 wherein the poly(epsilon-caprolactone)polyester glycol of about 2,000 molecular weight is obtained from the reaction of a polyester glycol of about 350–500 molecular weight derived from phthalic acid or phthalic anhydride with ethylene glycol, and epsilon-caprolactone.

3. The process of claim 1 wherein the mixture of chain extenders is made up of about 3 parts 1,4-butanediol and 1 part phenylenediethanolamine.

* * * * *